United States Patent
Hwang et al.

(10) Patent No.: US 8,488,526 B2
(45) Date of Patent: Jul. 16, 2013

(54) NETWORK COMMUNICATION METHOD AND NETWORK DEVICE USING PREAMBLE

(75) Inventors: Sung-Hyun Hwang, Daejeon (KR); Jung-Sun Um, Suwon (KR); Gwangzeen Ko, Seoul (KR); Myung-Sun Song, Daejeon (KR); Chang-Joo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 307 days.

(21) Appl. No.: 12/747,299

(22) PCT Filed: Dec. 10, 2008

(86) PCT No.: PCT/KR2008/007298
§ 371 (c)(1),
(2), (4) Date: Jun. 11, 2010

(87) PCT Pub. No.: WO2009/075519
PCT Pub. Date: Jun. 18, 2009

(65) Prior Publication Data
US 2010/0260106 A1    Oct. 14, 2010

Related U.S. Application Data

(60) Provisional application No. 61/012,519, filed on Dec. 10, 2007.

(51) Int. Cl.
*H04J 11/00* (2006.01)
*H04J 3/24* (2006.01)
*H04W 4/00* (2009.01)

(52) U.S. Cl.
USPC ............ 370/328; 370/203; 370/338; 370/475

(58) Field of Classification Search
None
See application file for complete search history.

(56) References Cited

U.S. PATENT DOCUMENTS

| | | | |
|---|---|---|---|
| 5,831,544 A * | 11/1998 | Park | 340/7.33 |
| 2005/0111522 A1* | 5/2005 | Sung et al. | 375/145 |
| 2005/0250528 A1* | 11/2005 | Song et al. | 455/522 |
| 2005/0286474 A1 | 12/2005 | van Zelst et al. | |
| 2006/0025136 A1* | 2/2006 | Fujita et al. | 455/436 |
| 2006/0050799 A1 | 3/2006 | Hou et al. | |
| 2007/0036065 A1 | 2/2007 | Wang | |
| 2007/0149230 A1* | 6/2007 | Song et al. | 455/515 |

OTHER PUBLICATIONS

Nandula, Sridhar et al., "On Synchronization Algorithms for OFDMA based Wireless MAN system," Proceedings of the 2007 IEEE International Conference on Telecommunications adn Malaysia International Conference on Communications, pp. 515-519 (2007).

* cited by examiner

*Primary Examiner* — Faruk Hamza
*Assistant Examiner* — Diane Lo
(74) *Attorney, Agent, or Firm* — Nelson Mullins Riley & Scarborough LLP; EuiHoon Lee, Esq.

(57) ABSTRACT

Provided are a network communication method and a network device using a preamble. According to the network communication method and the network device, network coexistence is easily achieved by using network identification transmitted in the preamble, and an unknown terminal, which has a low reception signal to noise ratio (SNR) and has not yet been connected to an existing network, is easily connected to the existing network.

14 Claims, 6 Drawing Sheets

FIG. 1A
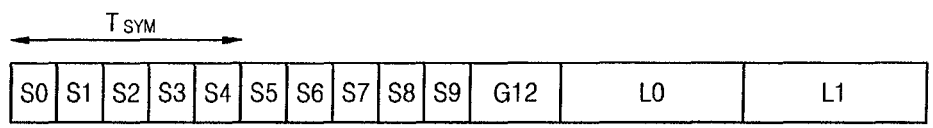
FIG. 1B
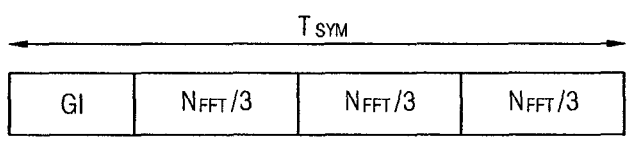
FIG. 2
| NETWORK ID INDEX | PATTERN OF PREAMBLE (HEXADECIMAL FORM) |
|---|---|
| 0 | 0x4C5F... |
| 1 | 0xA1B9... |
| 2 | 0x104A... |
| 3 | 0x0B49... |
| 4 | 0x9927... |
| 5 | 0x215F... |
| 6 | 0x9F08... |
| 7 | 0xABE4... |
| 8 | 0x6898... |
| 9 | 0xAD7D... |
| 10 | 0x9CC0... |
| 11 | 0x7941... |
| 12 | 0x53FF... |
| 13 | 0x5811... |
| 14 | 0xD825... |
| 15 | 0xC828... |

NETWORK COMMUNICATION METHOD AND NETWORK DEVICE USING PREAMBLE

RELATED APPLICATIONS

This application is a 35 U.S.C. §371 national stage filing of PCT Application No. PCT/KR2008/007298 filed on Dec. 10, 2008, which claims priority to, and the benefit of, U.S. patent application Ser. No. 61/012,519 filed on Dec. 10, 2007. The contents of the aforementioned applications are hereby incorporated by reference.

TECHNICAL FIELD

The present invention relates to a network communication method and a network device using a preamble, and more particularly, to a network coexistence method and a network connection method, which transmit a preamble by inserting network identification information into the preamble and use the detected network identification information, and a network device performing the network coexistence method and the network connection method.

The present invention is supported by the Information Technology (IT) Research & Development (R&D) program of the Ministry of Information and Communication (MIC) and the Institute for Information Technology Advancement (IITA) [2005-S-002-04, Development of Cognitive Radio Technology for Spectrum Utility Improvement].

BACKGROUND ART

Network coexistence is achieved relatively easily when networks communicate with each other, but when the networks do not communicate with each other, network coexistence is restricted since there is no information about an adjacent network. Specifically, since there is no information about a channel that is used by the adjacent network, transmission power is minimized so as to reduce interference. However, in this case, terminals at the edge of a cell may fail to communicate. Also, for a terminal having a low reception signal to noise ratio (SNR) to communicate, the terminal must move to within a communicatable range and then turn on again, since another terminal in an existing network cannot increase transmission power because the existence of a predetermined terminal is not known.

The networks must communicate with each other for network coexistence, but in a home network, due to security, the network coexistence must be possible without communication between the networks. Also, a terminal which is turned on in a low reception SNR area is unable to receive a header or a beacon from an existing network, and thus is unable to connect to the existing network.

DETAILED DESCRIPTION OF THE INVENTION

Technical Problem

The present invention provides a method which enables network coexistence without communication between networks, and enables a terminal having a low reception signal to noise ratio (SNR) to connect to a network.

Other objectives and merits of the present invention may be understood from the following descriptions, and clarified from the embodiments of the present invention. Also, it is easily known that the objectives and merits of the present invention are realized by means shown in the claims and by combining the means.

Technical Solution

The present invention is related to a network connection method using a preamble.

Advantageous Effects

According to the present invention, network coexistence is easily achieved in an ad-hoc network, such as a home network, by using network identification (ID) carried in a preamble, and an unknown terminal, which has a low reception signal to noise ratio (SNR) and has not yet been connected to an existing network, can be easily connected to the existing network.

Also, since the present invention operates in a physical (PHY) layer, processing latency can be reduced compared to a method operated in a media access control (MAC) layer, and power consumption is reduced since power of function blocks after Viterbi decoder can be blocked.

Also in an adjacent cell environment using the same channel (frequency reuse factor=1), the present invention operates during an idle time instead of a communication activation time, and thus a separate overhead (a quiet period of time in the case of a cognitive radio) is not required, and security is high since the present invention operates without exchanging or adjusting information with an adjacent network.

DESCRIPTION OF THE DRAWINGS

FIG. 1A is a diagram illustrating a preamble structure used in a wireless local area network (WLAN) or high performance radio LAN 2 (HiperLAN2) of IEEE 801.11a;

FIG. 1B is a diagram illustrating a preamble structure used in worldwide interoperability for microwave access (WiMAX) of IEEE 802.16e;

FIGS. 2 and 3 are diagrams for describing a method of transmitting network identification (ID) in a preamble, according to an embodiment of the present invention;

BEST MODE

Figure 3:
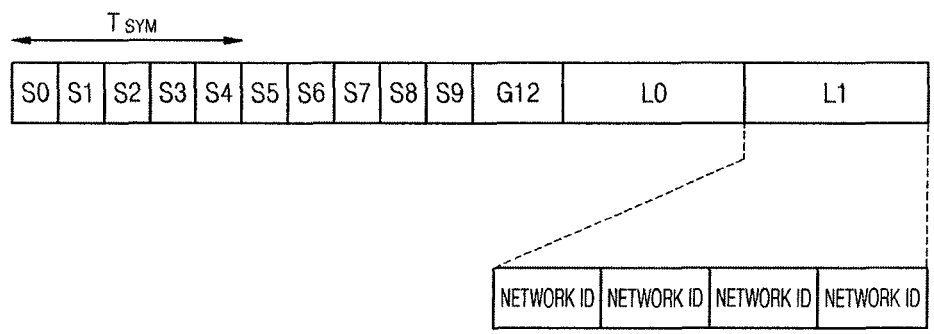

According to an aspect of the present invention, there is provided a network communication method of a device, the network communication method including: detecting a preamble; and extracting network identification information from the detected preamble.

According to another aspect of the present invention, there is provided a network coexistence method of a device, the network coexistence method including: detecting a preamble transmitted by a device of a second network using the same channel as a device of a first network, wherein the detecting is performed by the device of the first network; and extracting network identification information of the second network from the detected preamble.

According to another aspect of the present invention, there is provided a network connection method of a device, the network connection method including: detecting a preamble in a reference frame, wherein the detecting is performed by a device connected to an existing used channel in a low data reception signal to noise ratio (SNR) area; and extracting network identification information from the detected preamble.

According to another aspect of the present invention, there is provided a network communication method of a device, the network communication method including: generating a preamble; and inserting network identification information into the generated preamble.

According to another aspect of the present invention, there is provided a network device including: a preamble detector which detects a preamble; and an identification information extractor which extracts network identification information from the detected preamble.

According to another aspect of the present invention, there is provided a network device including: a preamble generator which generates a preamble; and an identification information inserter which inserts network identification information into the generated preamble.

Mode of the Invention

Hereinafter, the present invention will be described more fully with reference to the accompanying drawings, in which exemplary embodiments of the invention are shown. In the drawings, like reference numerals denote like elements. Also, while describing the present invention, detailed descriptions about related well-known functions or configurations, which may diminish the clarity of the points of the present invention, are omitted.

It will be understood that when a part "includes" an element, the part does not exclude other elements, but may further include the other elements unless otherwise stated. Also, terms such as "unit" and "block" denote a unit that performs at least one function or operation, which may be realized in hardware, software, or in combination of hardware and software.

The present invention is about a method of connecting to a network by using a preamble, and is called a preamble aided link adaptation technology. In the present invention, a preamble has a different pattern according to network identification (ID). Here, the network ID is a unique ID of a cell or a network, and a base station ID in cellular communication may be the network ID. In other words, the network ID is a term used as an identical and unique ID shared by all terminals in a network. Accordingly, even when the same channel is used, a pattern of the preamble differs according to a network.

A structure of the preamble may be different according to a system to which it is applied. The preamble is basically used for synchronization and channel estimation.

FIG. 1A is a diagram illustrating a preamble structure used in a wireless local area network (WLAN) or high performance radio LAN 2 (HiperLAN2) of IEEE 801.11a. Referring to FIG. 1A, two orthogonal frequency division multiplexing (OFDM) symbols are used for initial synchronization and two OFDM symbols are used for channel estimation.

FIG. 1B is a diagram illustrating a preamble structure used in worldwide interoperability for microwave access (WiMAX) of IEEE 802.16e. Referring to FIG. 1B, one OFDM symbol is used for synchronization and channel estimation.

FIGS. 2 and 3 are diagrams for describing a method of transmitting network identification (ID) in a preamble, according to an embodiment of the present invention.

FIG. 2 is in regard to a method of generating different patterns of a preamble according to a network ID. For example, 16 different patterns of a preamble may be formed in a network ID of 4 bits. When the number of bits in the network ID is high, a preamble may be generated by forming a pattern of the preamble by using a part of the number of bits, for example, 8 bits out of 16 bits. According to such a method, when a channel needs to be estimated by using the preamble, the preamble is detected first, and then the channel is estimated by using the detected preamble. Here, the preamble may have a pattern satisfying a low peak to average power ratio (PAPR).

FIG. 3 is in regard to a method of, when a preamble for channel estimation is repeated twice, using a first preamble by transmitting a fixed pattern in the first preamble, and transmitting a network ID in a second preamble. For example, when a number of subcarriers of the second preamble is 16, a network ID of 4 bits may be repeatedly transmitted 4 times by using a binary phase shift key (BPSK). When the number of subcarriers of the preamble is bigger than the number of bits of the network is ID, a gain according to repetitive transmission may be obtained.

The method of transmitting a network ID in a preamble may be variously designed according to a structure of the preamble, aside from the above described embodiment.

Figure 4:
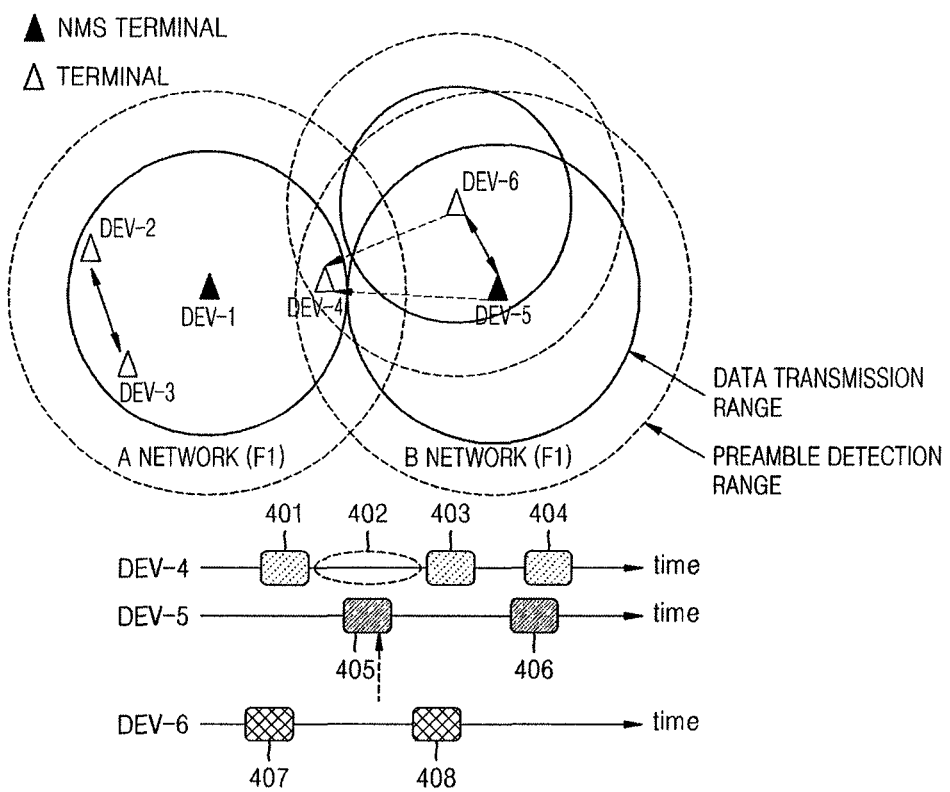
FIG. 4 is a diagram for describing a method of coexisting with an adjacent network, wherein the method is performed by a terminal existing in an existing network, according to an embodiment of the present invention.

FIG. 4 is a diagram for describing a method of coexisting with an adjacent network, wherein the method is performed by a terminal existing in an existing network, according to an embodiment of the present invention.

In FIG. 4, areas within solid lines are data transmittable areas, and areas within dotted lines are preamble detectable areas. Generally, the preamble detectable area is larger than the data transmittable area due to a correlation gain used while detecting a preamble. Also, a black triangle is a terminal having a network management system (NMS) function, for example, an access point in a WLAN or a base station in cellular communication, and a white triangle is a terminal without an NMS function.

FIG. 4 illustrates an example of self-coexistence between networks, which is achieved by using a preamble when adjacent networks use the same channel. Here, a frequency reuse factor of a network A and a network B is 1, and the networks A and B use the same frequency channel (F1).

A terminal DEV4 located on a cell boundary of the network A is located in an area that is unable to receive data from any of terminals of the network B. When the network A and the network B do not communicate with each other, there is no information to perform any function for network coexistence. Here, when the terminal DEV4 in the network is able to receive preambles from a terminal DEV5 and a terminal DEV6, the terminal DEV4 may detect network ID from the preambles and use the network ID in the network coexistence.

The terminal DEV4 transmits packets 401, 403, and 404, the terminal DEV5 transmits packets 405 and 406, and the terminal DEV6 transmits packets 407 and 408. In this case, since the terminal DEV4 is able to detect the preamble of the network B during an idle period of the network A, the terminal DEV4 detects a preamble of the packet 405 of the network B during an idle period 402.

The method of coexisting with an adjacent network according to the current embodiment of the present invention may also be applied to a network system using different frequency channels, in which a frequency reuse factor is not 1. When the terminal DEV4 receives data and detects a preamble by using a separate means, the terminal DEV4 is able to always detect preambles from the packets 405 and 406 of the terminal DEV5 or the packets 407 and 408 of the terminal DEV6.

According to the current embodiment of the present invention, network coexistence of a terminal is possible via a detected network ID without communicating with an adjacent network, and a separate overhead, such as a quiet period (QP), is not required. Moreover, since the network ID is detected in a PHY layer, process latency and power consumption are minimized.

Figure 5:
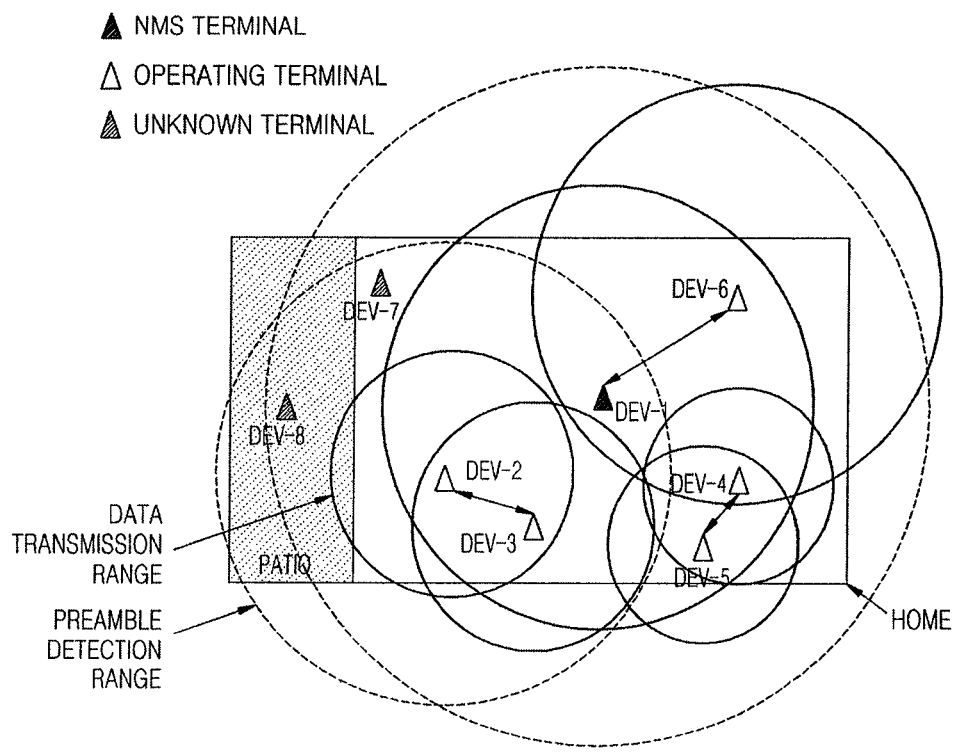
FIG. 5 is a diagram for describing a method of connecting to an existing network, wherein the method is performed by a terminal in a low data reception signal to noise ratio (SNR) area, according to an embodiment of the present invention.

FIG. 5 is a diagram for describing a method of connecting to an existing network, wherein the method is performed by a terminal in a low data reception signal to noise ratio (SNR) area, according to an embodiment of the present invention.

In FIG. 5, areas within solid lines are data transmittable areas, and areas within dotted lines are preamble detectable areas. Also, a black triangle is a terminal having an NMS function, for example, an access point in a WLAN or a base station in cellular communication, a white triangle is an operating terminal without an NMS function, and a triangle filled with diagonal lines is an unknown terminal without an NMS function.

When a terminal that is turned on in a low reception SNR area is unable to receive a header or a beacon of a frame from an existing network, the preamble aided link adaptation technology of the present invention may be used to connect to the existing network.

When a user turns a terminal DEV8 on in a patio or a terrace or turns a terminal DEV7 on in a corner of a room where a signal of the existing network cannot be received, reception SNRs of an unknown terminal, the terminal DEV7, and the terminal DEV8 may be too low to receive a header or a beacon from the existing network. However, when the terminal DEV7 or the terminal DEV8 is in the preamble detectable area of another terminal in the existing network, such as a terminal DEV1 or a terminal DEV2, the terminal DEV7 or the terminal DEV8 may successfully receive a preamble from the other terminal and detect network ID from the preamble. When the network ID detected by the terminal DEV7 or the terminal DEV8 is an ID of a network that a user belongs to, the terminal DEV7 or the terminal DEV8 may transmit a message requesting other terminals in the existing network to increase data transmission power in a contention time slot.

Figure 6:
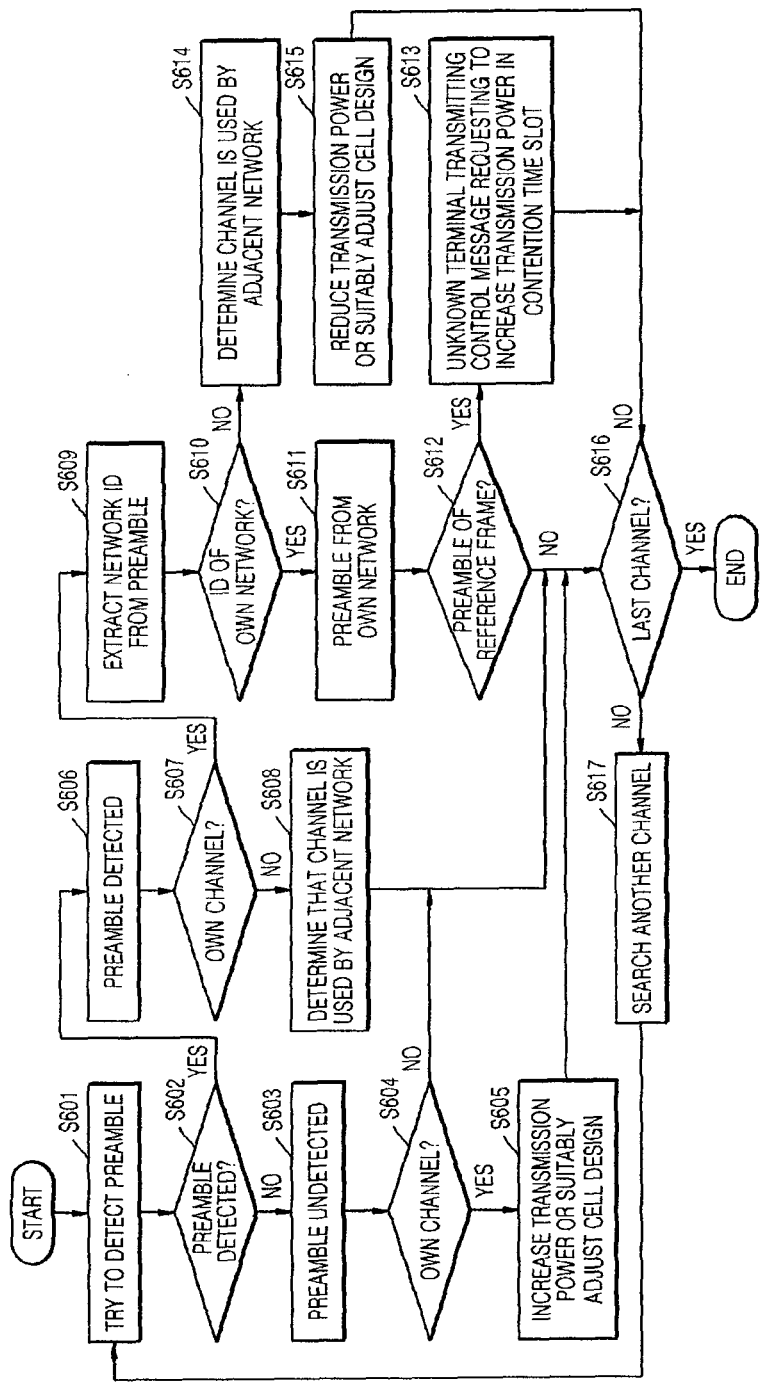
FIG. 6 is a flowchart describing controlling of transmission power and cell design by applying a preamble aided link adaption technology, according to an embodiment of the present invention.

FIG. 6 is a flowchart describing controlling of transmission power and cell design by applying a preamble aided link adaption technology, according to an embodiment of s the present invention.

In operation S601, a terminal, which is a device that belongs to a certain network, tries to detect a preamble by using a unique pattern used in the preamble in a searched channel.

The terminal determines whether the preamble is detected in operation S602.

When the preamble is not detected in operation S603, the terminal determines whether the searched channel is a channel used by a network that the terminal belongs to (hereinafter, referred to as its own network) in operation S604.

When the searched channel is the channel used by the terminal's own network, the terminal increases transmission power or suitably adjusts a cell design in operation S605. The terminal shares a result of increasing the transmission power or adjusting the cell design with other terminals. Alternatively, the terminal may feed back a result of detecting the preamble to a master terminal so that the transmission power or the cell design is controlled by the master terminal.

When the searched channel is not the channel used by the terminal's own network, the terminal determines whether the searched channel is the last channel in operation S616, and when the searched channel is not the last channel, a following channel is searched in operation S617.

When the preamble is detected in the searched channel in operation S606, the terminal checks whether the searched channel is used by the terminal's own network in operation S607.

When the searched channel is not the channel used by the terminal's own network, the terminal determines that the searched channel is used by an adjacent network in operation S608, checks whether the searched channel is the last channel in operation S616, and when the searched channel is not the last channel, continuously searches a following channel in operation S617.

When a channel from which the preamble is detected is used by the terminal's own network, the terminal extracts network ID from the preamble in operation S609. Then, the terminal checks whether the extracted network ID is ID of its own network in operation S610.

When the extracted network ID is the ID of the terminal's own network, the terminal determines that the detected preamble is from its own network in operation S611, and determines whether the preamble is a preamble of a reference frame in operation S612.

When the preamble is the preamble of the reference frame and the terminal is an unknown terminal, a control message requesting to increase transmission power is transmitted in a contention time slot in operation S613. When the preamble is not the preamble of the reference frame, the terminal determines whether the searched channel is the last channel in operation S616, and when the searched channel is not the last channel, a following channel is continuously searched in operation S617.

When the channel from which the preamble is detected is identical to the channel used by the terminal's own network but the extracted ID is not the ID of its own network, the terminal determines that the channel is used by an adjacent network in operation S614, and reduces transmission power or suitably adjusts a cell design in operation S615. Then, the terminal checks whether the channel is the last channel in operation S616, and when the channel is not the last channel, continuously searches a following channel in operation S617.

Figure 7:
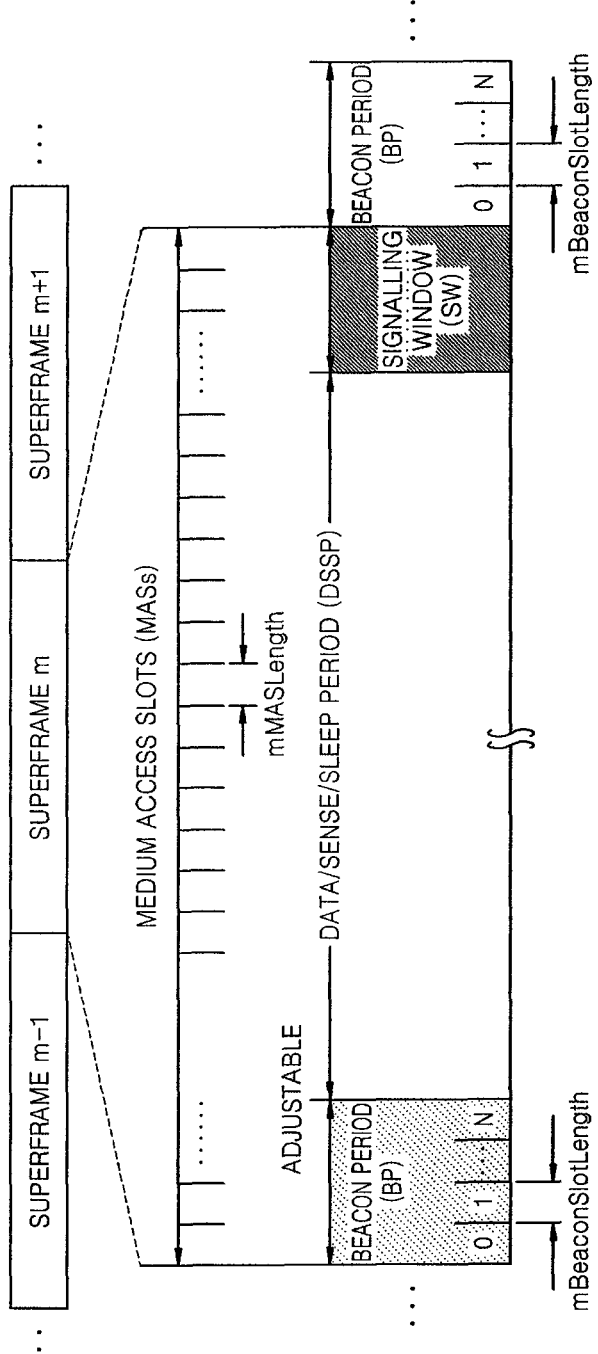
FIG. 7 is a diagram illustrating a media access control (MAC) frame structure usable in a home network or in a wireless personal area network (WPAN), according to an embodiment of the present invention.

FIG. 7 is a diagram illustrating a media access control (MAC) frame structure usable in a home network or in a wireless personal area network (WPAN), according to an embodiment of the present invention.

Referring to FIG. 7, time is divided into time slots called medium access slots (MASs), and a superframe may be divided into a beacon period for transmitting a beacon, a data/sense/sleep period (DSSP) including a data transmission period, a sensing period, and a sleep period, and a signaling window (SW) period for transmitting a control message. An unknown terminal detects a preamble from a reference frame, for example, a beacon frame, related to channel scheduling, identifies the SW period, and transmits a control message requesting to increase transmission power during the SW period.

Figure 8:
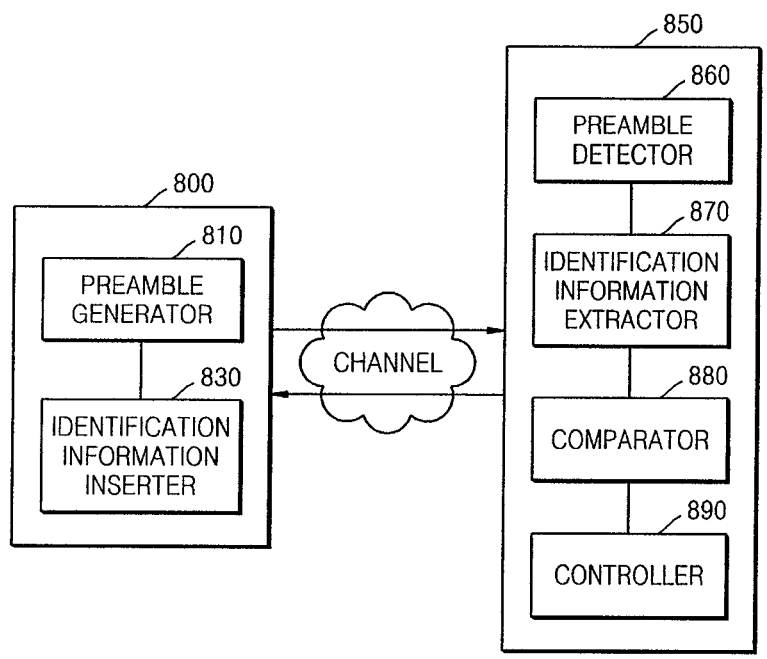
FIG. 8 is a schematic block diagram illustrating a network communication system using a preamble, according to an embodiment of the present invention.

FIG. 8 is a schematic block diagram illustrating a network communication system using a preamble, according to an embodiment of the present invention.

Referring to FIG. 8, the network communication system includes a transmission device 800 and a reception device 850.

The transmission device 800 generates a preamble and inserts network identification information into the generated preamble, and includes a preamble generator 810 and an identification information inserter 830. The preamble generator 810 generates the preamble, and the identification information inserter 830 inserts the network identification information (network ID) into the generated preamble. A pattern of a preamble defined to correspond to the network identification information may be applied to a preamble for channel estimation, or the network identification information may be repeatedly inserted into surplus preambles following the preamble for channel estimation. However, a method of inserting the network identification information into the preamble is not limited to the above, and may vary according to network and communication types. The preamble into which the network identification information is inserted is transmitted to the reception device 850 via a channel.

The reception device 850 includes a preamble detector 860, an identification information extractor 870, a comparator 880, and a controller 890.

The reception device 850 searches and determines a channel to detect a preamble.

The preamble detector 860 detects a preamble in a predetermined channel. At least one candidate channel for detecting a preamble may be determined according to a result of searching for channels by a channel detector (not shown). When the to preamble detector 860 has a data receiving function, the reception device 850 is able to detect the preamble only during an idle period of a network to which the reception device 850 belongs. When a data receiver (not shown) is installed separately from the preamble detector 860, the reception device 850 detects the preamble from an adjacent network of the same channel only during the idle period of the network to which the reception device 850 belongs, and detects the preamble all the time from the adjacent network of different channel regardless of data transmission. When the preamble is not detected from a candidate channel which is not a channel used by the preamble detector 860, the preamble detector 860 connects a following candidate channel to detect a preamble.

The identification information extractor 870 extracts network identification information from the detected preamble. The comparator 880 checks a network corresponding to the extracted network identification information, and compares the network with a network to which the reception device 850 belongs. When the network corresponding to the network identification information and the network to which the reception device 850 belongs are different but use the same channel, the controller 890 decreases transmission power or adjusts a cell design so that the networks adjacently operate without interference. Alternatively, when the networks are identical and use the same channel, the controller 890 transmits a control message requesting other devices in the network to increase transmission power, so that the reception device 850 located in a low data reception SNR area easily connects to the network. The control message is transmitted after a reference frame is received and a location of a contention time slot is determined. When the preamble is not detected, the controller 890 controls the reception device 850 to detect the preamble in a following channel, and when the preamble is not detected in a channel used by the reception device 850, controls the reception device 850 to increase transmission power or adjust a cell design. A result of changing the transmission power or cell design is shared with other terminals. Alternatively, the transmission power or the cell design may be changed by a master terminal that received a result of detecting the preamble from the terminal.

The network ID (or base station ID) extracted from the preamble is used for effective network coexistence, and is used to enable an unknown terminal, which has a low reception SNR and has not yet been connected to an existing network, to easily connect to the existing network. The network ID extracted for the network coexistence is used to control the cell design and transmission power.

In alternative embodiments, hard-wired circuitry may be used in place of or in combination with processor/controller programmed with computer software instructions to implement the invention. Thus, embodiments of the invention are not limited to any specific combination of hardware circuitry and software.

The present invention claims the benefit of U.S. Provisional Application No. 61/012,519, filed on Dec. 10, 2007, in the US Patents and Trademark Office, the disclosure of which is incorporated herein in its entirety by reference.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Specific terms used herein are only for descriptive purposes only, and are not intended to limit the scope of the invention.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A network communication method of a device, the network communication method comprising:
   detecting a preamble;
   extracting network identification information from the detected preamble,
   in response to a determination that a detected channel of the preamble is identical to a used channel of the device, determining whether a network corresponding to the extracted network identification information and a network to which the device belongs are the same or different; and
   changing transmission power so that the networks operate adjacent to each other in response to the extracted network identification information and the network to which the device belongs being different, or
   requesting to control transmission power to other devices in the network in response to the extracted network identification information and the network to which the device belongs being the same.

2. The network communication method of claim 1, wherein the detecting of the preamble comprises detecting the preamble during an idle period of a network to which the device belongs in the same channel as a used channel of the device.

3. The network communication method of claim 1, wherein the detecting of the preamble comprises, when the preamble is detected regardless of a data transmission and reception process of the device, detecting the preamble during an idle period of a network to which the device belongs in the same channel as a used channel of the device, and detecting the preamble during an idle period and a data transmission and reception period of the network to which the device belongs in a channel different from the used channel of the device.

4. A network connection method of a device, the network connection method comprising:
  detecting a preamble in a reference frame, wherein the detecting is performed by a device connected to an existing used channel in a low data reception signal to noise (SNR) area;
  extracting network identification information from the detected preamble,
  in response to a determination that a detected channel of the preamble is identical to a used channel of the device, determining whether a network corresponding to the extracted network identification information and a network to which the device belongs are the same or different; and
  changing transmission power so that the networks operate adjacent to each other in response to the extracted network identification information and the network to which the device belongs being different, or
  requesting to control transmission power to other devices in the network in response to the extracted network identification information and the network to which the device belongs being the same.

5. The network connection method of claim 4, wherein the requesting comprises requesting to increase the data transmission power in a control message transmission period after receiving the reference frame and checking a location of a contention time slot.

6. A network communication method of a device, the network communication method comprising:
  generating a preamble;
  inserting network identification information into the generated preamble, the network identification information enabling a device operating in the network to, in response to a determination that a detected channel of the preamble is identical to a used channel of the device, determine whether a network corresponding to the extracted network identification information and a network to which the device belongs are the same or different; and
  changing transmission power so that the networks operate adjacent to each other in response to the extracted network identification information and the network to which the device belongs being different, or
  requesting to control transmission power to other devices in the network in response to the extracted network identification information and the network to which the device belongs being the same.

7. The network communication method of claim 6, wherein the network identification information is a certain pattern applied to a preamble for channel estimation.

8. The network communication method of claim 6, wherein the network identification information is repeatedly inserted into surplus preambles following a preamble for channel estimation.

9. A network device comprising:
  a preamble detector which detects a preamble;
  an identification information extractor which extracts network identification information from the detected preamble, and
  a controller configured, in response to a determination that a detected channel of the preamble is identical to a used channel of the device, to determine whether a network corresponding to the extracted network identification information and a network to which the device belongs are the same or different; and
  change transmission power so that the networks operate adjacent to each other in response to the extracted network identification information and the network to which the device belongs being different, or
  request to control transmission power to other devices in the network in response to the extracted network identification information and the network to which the device belongs being the same.

10. The network device of claim 9, wherein when the preamble detector performs a data transmission and reception operation, the preamble is detected during an idle period of a network to which the device belongs.

11. The network device of claim 9, wherein when the preamble detector does not perform a data transmission and reception operation, the preamble is detected during an idle period of a network to which the device belongs in the same channel as a used channel of the device, and the preamble is detected during the idle period and a data transmission and reception period of the network to which the device belongs in a channel different from the used channel of the device.

12. A network device comprising:
  a preamble generator which generates a preamble; and
  an identification information inserter which inserts network identification information into the generated preamble, the network identification information enabling a device operating in a network to, in response to a determination that a detected channel of the preamble is identical to a used channel of the device, determine whether a network corresponding to the extracted network identification information and a network to which the device belongs are the same or different; and
  change transmission power so that the networks operate adjacent to each other in response to the extracted network identification information and the network to which the device belongs being different, or
  request to control transmission power to other devices in the network in response to the extracted network identification information and the network to which the device belongs being the same.

13. The network device of claim 12, wherein the network identification information is a certain pattern applied to a preamble for channel estimation.

14. The network device of claim 12, wherein the network identification information is repeatedly inserted into surplus preambles following a preamble for channel estimation.

* * * * *